(12) United States Patent
Iijima

(10) Patent No.: US 8,618,702 B2
(45) Date of Patent: Dec. 31, 2013

(54) VIBRATION ENERGY GENERATOR

(75) Inventor: Ryuta Iijima, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 44 days.

(21) Appl. No.: 13/433,236

(22) Filed: Mar. 28, 2012

(65) Prior Publication Data

US 2012/0194008 A1 Aug. 2, 2012

Related U.S. Application Data

(63) Continuation-in-part of application No. PCT/JP2010/066163, filed on Sep. 17, 2010.

(30) Foreign Application Priority Data

Sep. 29, 2009 (JP) .................. 2009-223651

(51) Int. Cl.
*H02K 33/00* (2006.01)

(52) U.S. Cl.
USPC ............................. 310/30; 310/36; 310/12.24

(58) Field of Classification Search
USPC ................ 310/15, 25, 30, 36, 12.24
See application file for complete search history.

(56) References Cited

U.S. PATENT DOCUMENTS

| | | | | |
|---|---|---|---|---|
| 6,043,572 A * | 3/2000 | Nagai et al. | ................. | 310/12.25 |
| 6,313,551 B1 * | 11/2001 | Hazelton | .................... | 310/12.24 |
| 6,936,937 B2 * | 8/2005 | Tu et al. | ..................... | 310/12.12 |
| 7,573,163 B2 * | 8/2009 | Tu et al. | ..................... | 310/12.21 |
| 7,622,832 B2 * | 11/2009 | Moriyama | ................. | 310/12.24 |
| 8,093,766 B2 * | 1/2012 | Hoshi et al. | ..................... | 310/14 |

FOREIGN PATENT DOCUMENTS

| | | |
|---|---|---|
| CN | 1771652 A | 5/2006 |
| JP | H03-026391 U | 7/1996 |
| JP | 2005-094832 A | 4/2005 |
| JP | 2006-296144 A | 10/2006 |

OTHER PUBLICATIONS

The International Bureau of WIPO, International Preliminary Report on Patentability for International Patent Application No. PCT/JP2010/066163 (counterpart to above-captioned patent application), mailed Apr. 12, 2012.

Japan Patent Office, Notice of Reasons for Rejection for Japanese Patent Application No. 2011-534199 (related to above-captioned patent application), mailed Oct. 22, 2013.

State Intellectual Property Office of the People's Republic of China, Notification of the First Office Action for Chinese Patent Application No. 201080043235.9 (counterpart to above-captioned patent application), mailed Jul. 30, 2013.

* cited by examiner

*Primary Examiner* — Nguyen N Hanh
(74) *Attorney, Agent, or Firm* — Baker Botts L.L.P.

(57) ABSTRACT

A vibration energy generator includes a case, a coil, a permanent magnet, and a shield magnet. The case is elongated in one direction and is made from a nonmagnetic material. The coil surrounds around an outer surface of the case. The permanent magnet reciprocates inside the case along the one direction. The permanent magnet is magnetized with a polarity oriented in the one direction. The shield magnet is disposed in one end portion of the permanent magnet in the one direction. Each of a surface of the one end portion and a surface of the shield magnet facing the surface of the one end portion has the same magnetic polarity. The length of the shield magnet in the one direction is less than the length of the permanent magnet in the one direction.

12 Claims, 10 Drawing Sheets

VIBRATION ENERGY GENERATOR

CROSS-REFERENCE TO RELATED APPLICATION

The present application is a Continuation-in-Part of International Application PCT/JP2010/066163, filed on Sep. 17, 2010, which claims the benefit of Japanese Patent Application No. 2009-223651, filed on Sep. 29, 2009, each of which is incorporated herein by reference.

BACKGROUND OF THE INVENTION

1. Field of the Invention

The present disclosure relates generally to a vibration energy generator that generates energy by vibration.

2. Description of Related Art

Battery-type vibration energy generators are known. Known battery-type vibration energy generators convert kinetic energy derived from vibration to electric energy. Such battery-type vibration energy generators do not require frequent replacement. The battery-type vibration energy generator is used semi-permanently and, thus, contributes to saving resources. As depicted in FIG. 7, a battery-type vibration energy generator 50 includes an electromagnetic induction coil 52 and a permanent magnet 53. The electromagnetic induction coil 52 is wrapped around an outer surface of a nonmagnetic tubular case 51. Induced current is generated in the electromagnetic induction coil 52 by reciprocation of the permanent magnet 53 inside the case 51 relative to the electromagnetic induction coil 52. The induced current is rectified by a rectifier circuit 54; stored in an energy storage unit 55, such as a secondary battery; and supplied to a positive electrode 56 and a negative electrode 57.

SUMMARY OF THE INVENTION

To prevent the permanent magnet 53 from being attracted to the positive electrode 56 and the negative electrode 57, the positive electrode 56 and the negative electrode 57 may be made of a nonmagnetic material, such as copper. Nevertheless, the vibration energy generator 50 generally is used in a battery case that is separate from the vibration energy generator 50. If metal contacts 61 and 62 of the battery case are made of a magnetic material, such as iron, the permanent magnet 53 may be attracted to the metal contacts 61 and 62. Because this hinders the movement of the permanent magnet 53 inside the case 51, the vibration energy generator 50 may be unable to generate energy.

When magnetic lines of force of a permanent magnet extend in a moving direction of the permanent magnet, the magnetic lines of force pass through a magnetic body which is present in the moving direction of the permanent magnet. If magnetic bodies are disposed at both ends of the permanent magnet in the moving direction, the movement of the permanent magnet may be hindered by attraction of the permanent magnet to the magnetic bodies. Even if the vibration energy generator is not a battery-type generator, the movement of the permanent magnet may be hindered by attraction of the permanent magnet to the magnetic bodies, so that the vibration energy generator may be unable to generate energy.

An object of the present disclosure is to provide a vibration energy generator that prevents a permanent magnet from being attracted to a magnetic body and reliably generates energy.

According to an embodiment of the present invention, a vibration energy generator may comprise a hollow case, a coil, a permanent magnet, and a shield magnet. The hollow case may be elongated in one direction, and may be made from a nonmagnetic material. The coil may surround an outer surface of the hollow case. The outer surface of the hollow case may extend in the one direction. The permanent magnet may be configured to reciprocate inside the hollow case along (e.g., parallel to) the one direction. The permanent magnet may be magnetized with a polarity oriented in (e.g., parallel to) the one direction. The shield magnet may be disposed adjacent to one end portion of the permanent magnet in the one direction. A surface of the one end portion and a surface of the shield magnet facing the surface of the one end portion may have the same magnetic polarities. The length of the shield magnet in the one direction may be less than the length of the permanent magnet in the one direction.

Other objects, features, and advantages of embodiments of the invention will be apparent to persons of ordinary skill in the art from the following description of embodiments with reference to the accompanying drawings.

BRIEF DESCRIPTION OF THE DRAWINGS

For a more complete understanding of the present invention, needs satisfied thereby, and the objects features, and advantages thereof, reference now is made to the following descriptions taken in connection with the accompanying drawings.

DESCRIPTION OF EMBODIMENTS OF THE INVENTION

Figure 1:
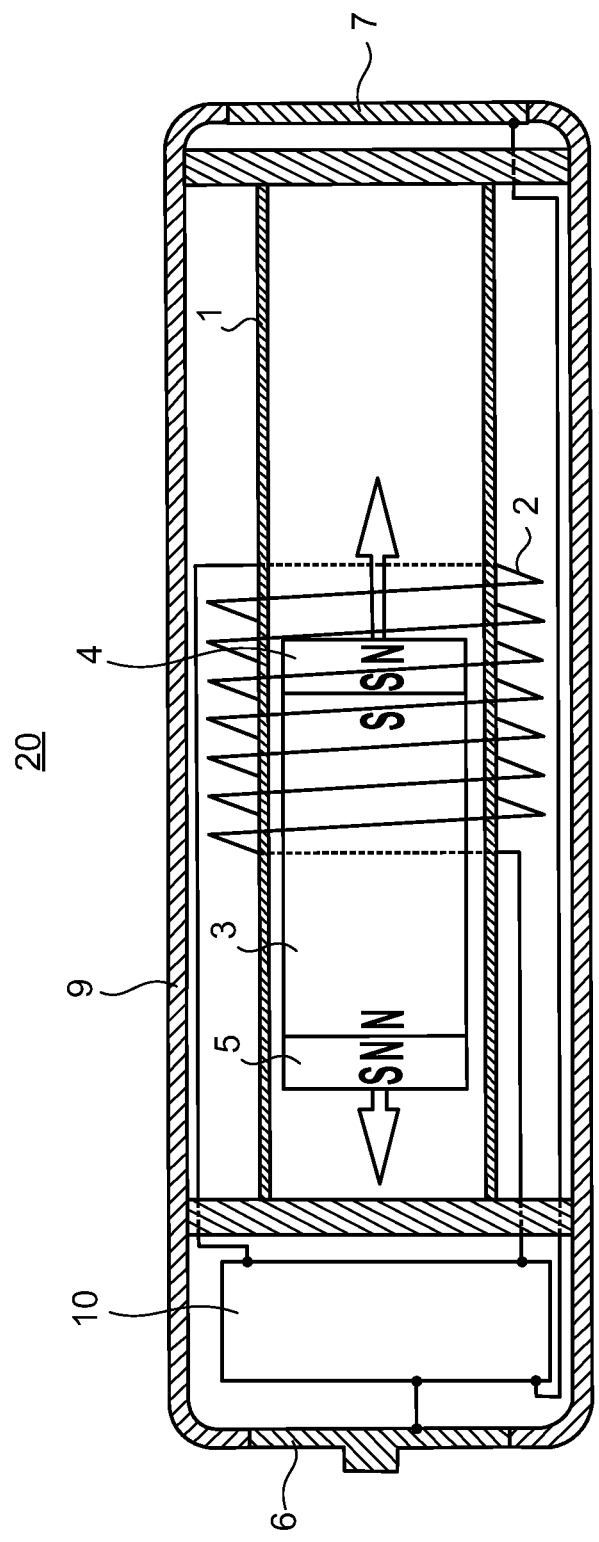
FIG. 1 is a cross-sectional view of a vibration energy generator according to an embodiment of the invention.

Embodiments of the invention are described in detail with reference to the accompanying drawings; like reference numerals are used for corresponding parts in the various drawings.

As depicted in FIG. 1, a vibration energy generator 20 of a first embodiment may comprise: a nonmagnetic tubular case 1 serving as a case, an electromagnetic induction coil 2, a permanent magnet 3, a first shield magnet 4, a second shield magnet 5, a positive electrode 6, a negative electrode 7, an outer case 9, and a rectified energy storage unit 10. For example, the vibration energy generator 20 of the first embodiment may be in the shape of a dry cell battery (e.g., shaped such that it may fit into known dry cell housings or receptacles). Therefore, the vibration energy generator 20 may be housed in a battery case for an electric or electronic device and may be used as a substitute for a dry cell battery. The battery case may be provided with positive and negative metal contacts.

The outer case 9 may have a substantially cylindrical shape with a substantially circular cross-section. The positive electrode 6 may be disposed in one end portion of the outer case 9, and the negative electrode 7 may be disposed in the other end portion of the outer case 9. The positive electrode 6 and the negative electrode 7 may be made of a nonmagnetic conductive material, such as brass, copper, or the like. The outer case 9 may contain the nonmagnetic tubular case 1, the electromagnetic induction coil 2, the permanent magnet 3, the first shield magnet 4, and the second shield magnet 5. The nonmagnetic tubular case 1 may be made of a nonmagnetic material, such as resin. The resin may be, for example, polyacetal. The nonmagnetic tubular case 1 also may have a substantially cylindrical shape with a substantially circular cross-section. The electromagnetic induction coil 2 may be wrapped around an outer surface of the nonmagnetic tubular case 1 in a longitudinal direction (which is an example of "one direction") of the nonmagnetic tubular case 1. For example, the electromagnetic induction coil 2 may be made from an enamel wire. The electromagnetic induction coil 2 may be connected at both ends thereof to the rectified energy storage unit 10.

The permanent magnet 3 may be disposed inside the nonmagnetic tubular case 1. The permanent magnet 3 may reciprocate in the longitudinal direction of the nonmagnetic tubular case 1. The permanent magnet 3 may be polarized in its reciprocating direction. In the first embodiment, the first shield magnet 4 may be secured to one end portion of the permanent magnet 3 in the longitudinal direction. A magnetic pole of the one end portion of the permanent magnet 3 and a magnetic pole of a surface of the first shield magnet 4 in contact with the one end portion may have the same polarity. The second shield magnet 5 may be secured to the other end portion of the permanent magnet 3 in the moving direction. A magnetic pole of the other end portion of the permanent magnet 3 and a magnetic pole of a surface of the second shield magnet 5 in contact with the other end portion may have the same polarity. The first shield magnet 4 and the second shield magnet 5 may be disposed on both sides of the permanent magnet 3, such that the same poles face each other. The first shield magnet 4 and the second shield magnet 5 may be secured to opposite end portions of the permanent magnet 3, for example, with screws, adhesive, or metal pieces. When the permanent magnet 3 reciprocates inside the nonmagnetic tubular case 1, induced current may be generated in the electromagnetic induction coil 2. In the present embodiment, the permanent magnet 3, the first shield magnet 4, and the second shield magnet 5 may have a substantially cylindrical shape with a substantially circular cross-section. Nevertheless, these magnets may have a shape different from the cylindrical shape with circular cross-section. The lengths of the first shield magnet 4 and the second shield magnet 5 in the moving direction may be less than the length of the permanent magnet 3.

Figure 2:
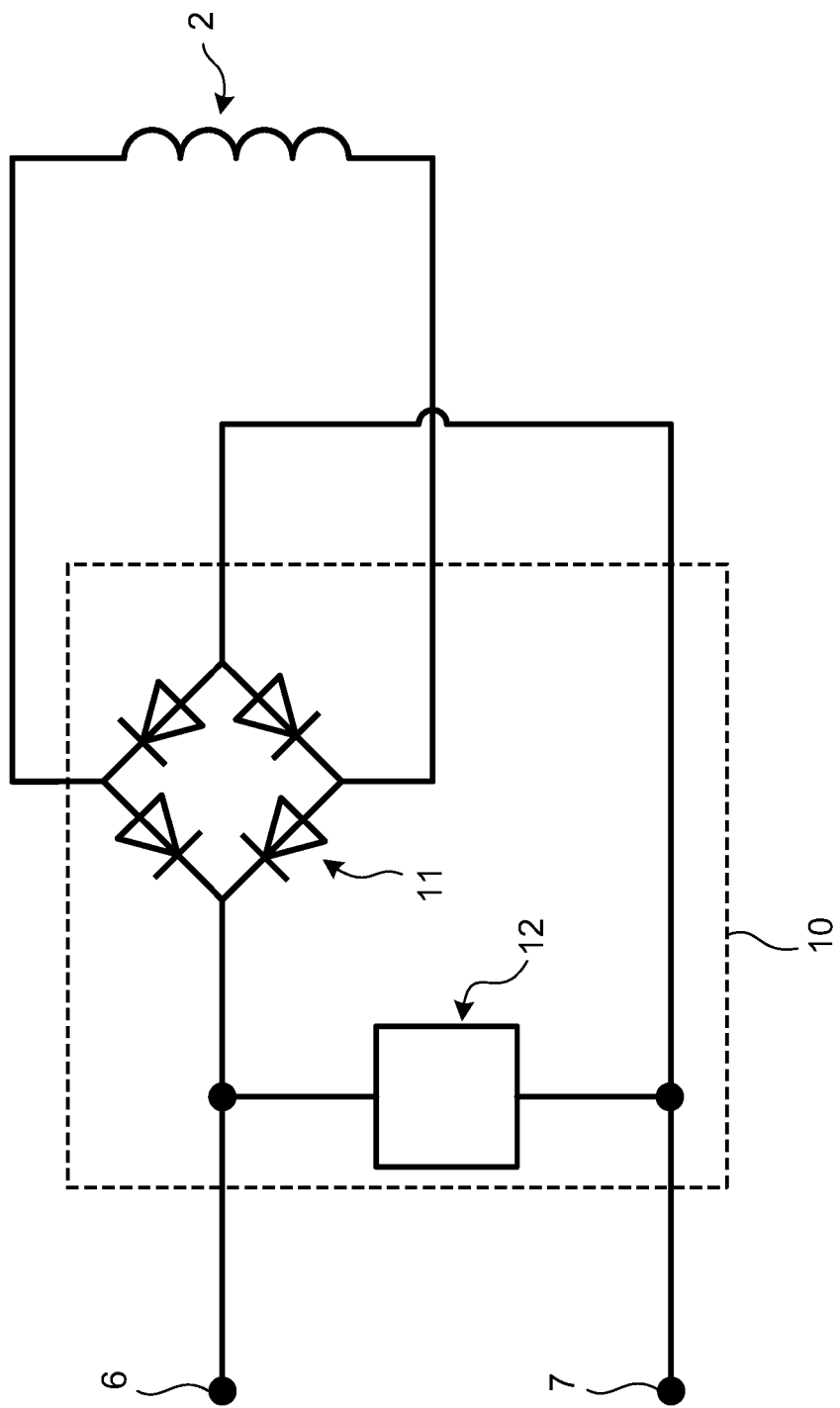
FIG. 2 is a schematic electrical diagram of the vibration energy generator.

As depicted in FIG. 2, the rectified energy storage unit 10 may include a bridge diode 11 and an energy storage unit 12. The bridge diode 11 may rectify induced current generated in the electromagnetic induction coil 2. The energy storage unit 12 may be charged by the rectified current. The electromagnetic induction coil 2 may be connected at both ends to the input side of the bridge diode 11. By reciprocation of the permanent magnet 3 inside the nonmagnetic tubular case 1, alternating current may be generated as induced current in the electromagnetic induction coil 2. The alternating current may be full-wave rectified by the bridge diode 11. The energy storage unit 12 may be connected to the output side of the bridge diode 11. The energy storage unit 12 may be, for example, a capacitor or a secondary battery. The current, which is full-wave rectified by the bridge diode 11, may be smoothed through ripple elimination performed by the energy storage unit 12. The positive electrode 6 and the negative electrode 7 may be connected to the energy storage unit 12. A potential difference between the positive electrode 6 and the negative electrode 7 may allow the smoothed current to be supplied from the energy storage unit 12.

In the first embodiment, depicted in FIG. 1, the rectified energy storage unit 10 may be disposed in a position outside one end portion of the nonmagnetic tubular case 1, in the longitudinal direction. This may allow the electromagnetic induction coil 2 to have a greater winding diameter and the permanent magnet 3 to have a greater diameter. Thus, it may be possible to generate greater induced current in the electromagnetic induction coil 2.

Effect of Shield Magnet

Figure 3A:
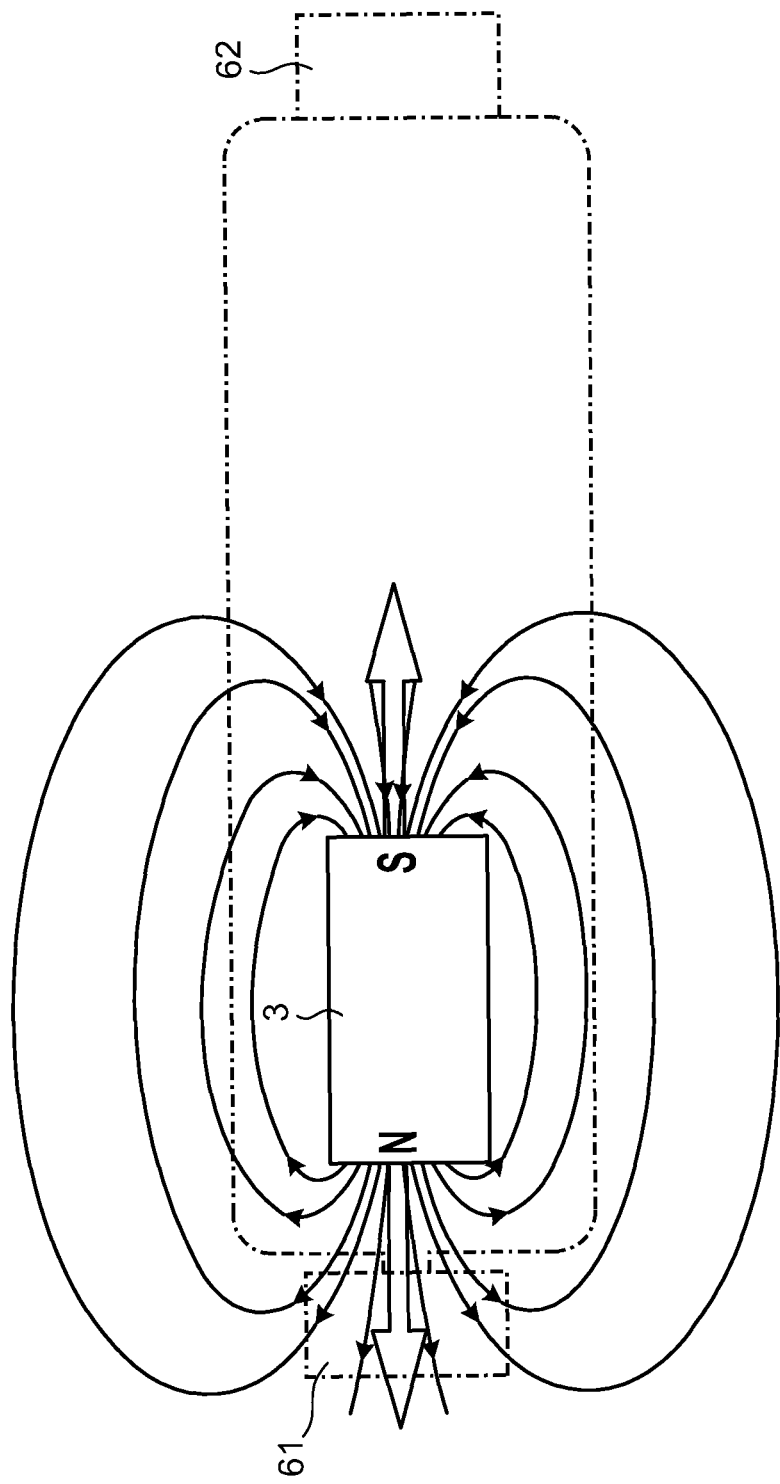
FIG. 3A depicts known radiation of magnetic lines of force without a shield magnet.
Figure 3B:
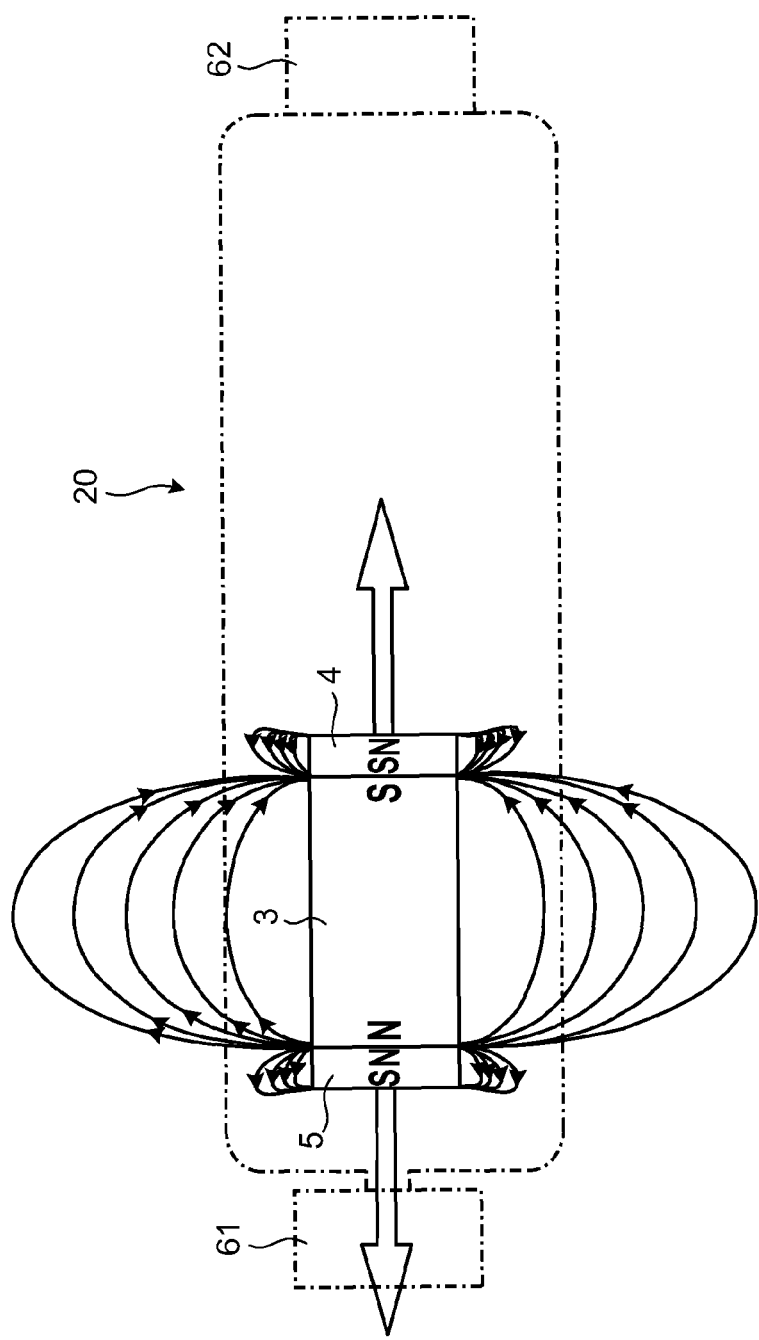
FIG. 3B depicts radiation of magnetic lines of force with shield magnets.

FIG. 3A depicts known radiation of magnetic lines of force without a shield magnet. Referring to FIG. 3A, without a shield magnet, the magnetic lines of force radiate from end faces of the permanent magnet 3 in the moving direction of the permanent magnet 3. Thus, the magnetic lines of force radiate toward the metal contacts 61 and 62 connected to the positive electrode 6 and the negative electrode 7, respectively. If the metal contacts 61 and 62 of the battery case for the electric or electronic device are magnetic bodies, the permanent magnet 3 is attracted to the metal contacts 61 and 62. On the other hand, as depicted in FIG. 3B, when the first shield magnet 4 and the second shield magnet 5 are secured to the respective end portions of the permanent magnet 3 with the same poles facing each other, magnetic lines of force radiating from the permanent magnet 3 and magnetic lines of force radiating from the first shield magnet 4 and the second shield magnet 5 may repel each other. Thus, the magnetic lines of force radiating from the end faces of the permanent magnet 3 in the moving direction of the permanent magnet 3 may be bent by the magnetic lines of force radiating from the first shield magnet 4 and the second shield magnet 5 in a direction perpendicular to the moving direction of the permanent magnet 3. This may prevent radiation of magnetic lines of force from the end faces of the permanent magnet 3 in the moving direction of the permanent magnet 3. Additionally, magnetic lines of force that radiate from end faces of the first and second shield magnets 4 and 5, opposite the sides in contact with the permanent magnet 3, and in the moving direction of the permanent magnet 3, may be attracted to strong magnetic fields near boundary surfaces between the permanent magnet 3 and the first and second shield magnets 4 and 5. This may reduce the magnetic flux density of magnetic lines of force in the moving direction. Therefore, the first shield magnet 4 and the second shield magnet 5 may prevent the permanent magnet 3 from being attracted to the metal contacts 61 and 62. In other words, magnetic lines of force of the permanent magnet 3 extending in the moving direction may be suppressed, and reliable energy generation may be ensured.

Figure 4A:
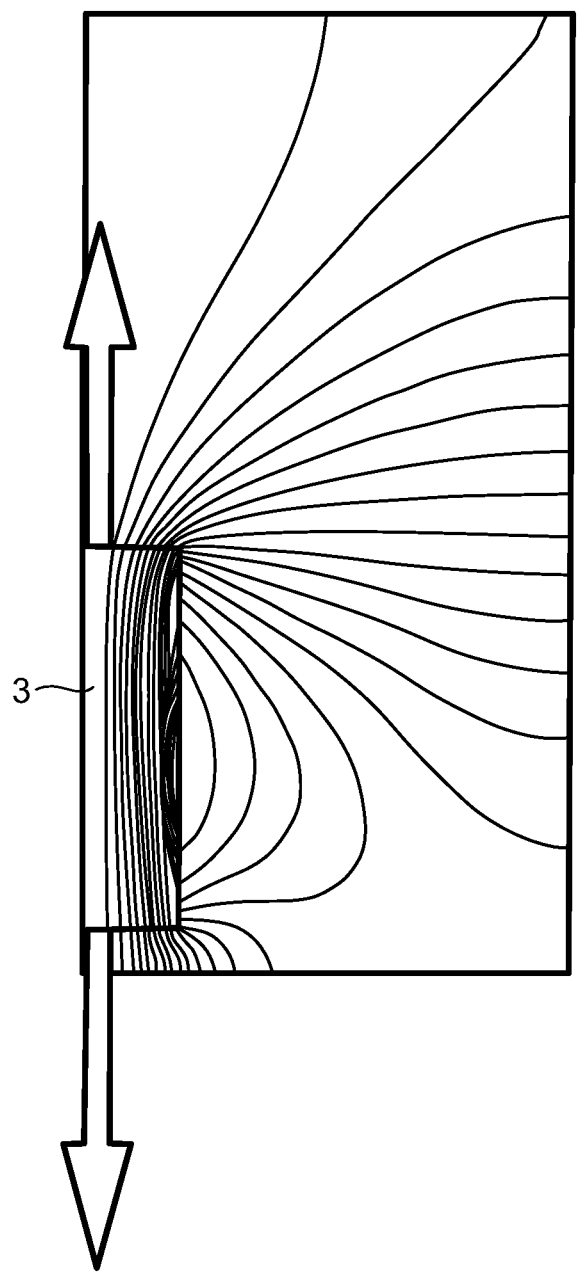
FIG. 4A depicts known radiation magnetic lines of force from a permanent magnet.
Figure 4B:
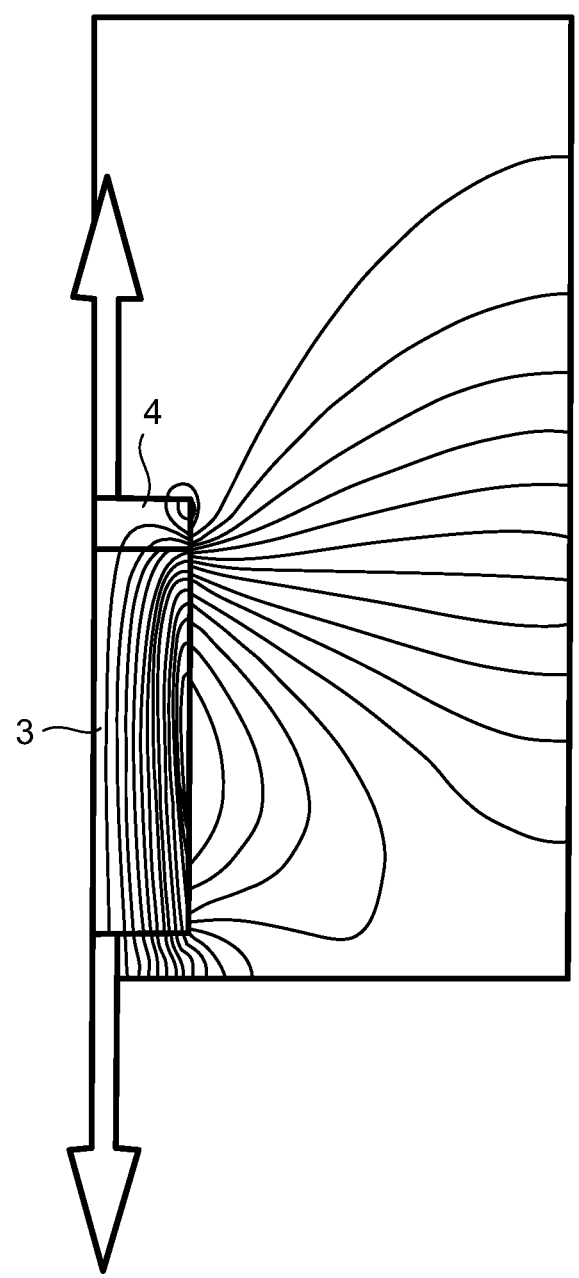
FIG. 4B depicts radiation of magnetic lines of force from a permanent magnet and a shield magnet with a thickness of about 1.0 mm.
Figure 4C:
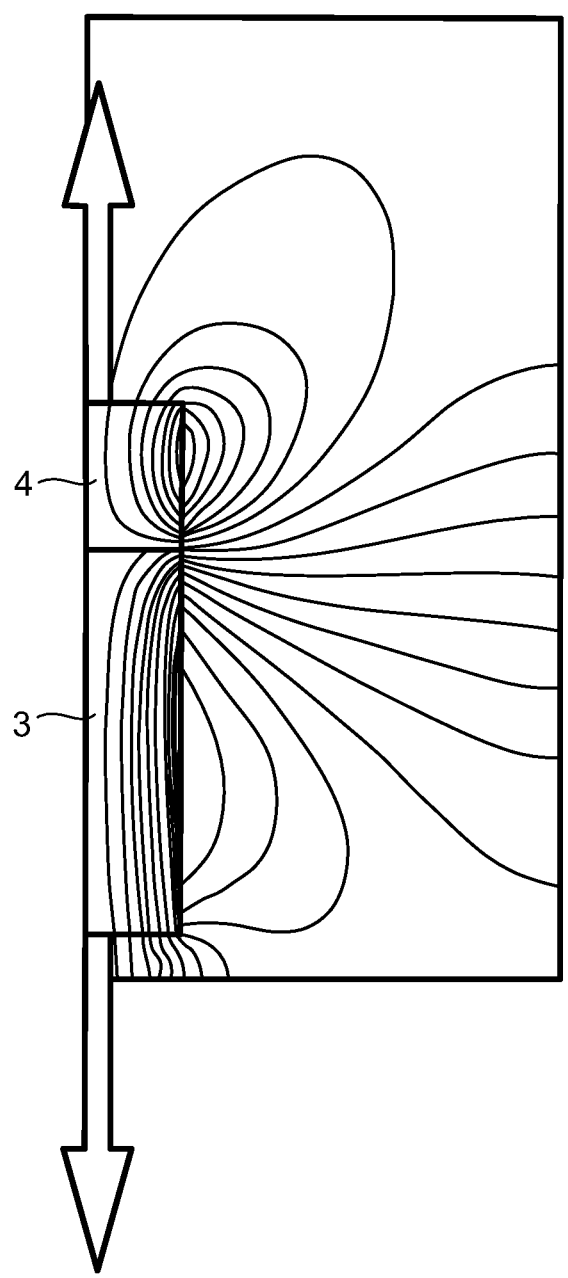
FIG. 4C depicts radiation of magnetic lines of force from a permanent magnet and a shield magnet with a thickness of about 3.0 mm.

FIGS. 4A through 4C depict magnetic lines of force radiating from the permanent magnet 3 and the shield magnet 4, which vary with varying thickness of the shield magnet 4. The thickness of the shield magnet 4 is a length of the shield magnet 4 in the moving direction of the permanent magnet 3. In the examples of FIGS. 4A through 4C, the permanent magnet 3 and the shield magnet 4 are magnets of the same type. For example, the permanent magnet 3 and the shield magnet 4 may be made of the same material. Each of permanent magnet 3 and the shield magnet 4 may have a circular cross section in a direction perpendicular to the moving direction of the permanent magnet 3. Each of the permanent magnet 3 and the shield magnet 4 also may have the same radius of, for example, about 2 mm. The moving direction of the permanent magnet 3 and the shield magnet 4 is indicated by arrows in FIGS. 4A through 4C.

FIG. 4A depicts known radiation magnetic lines of force from a permanent magnet. Referring to FIG. 4A, without the shield magnet 4, magnetic lines of force leak from the end faces of the permanent magnet 3 in the moving direction of the permanent magnet 3.

As depicted in FIG. 4C, in which the shield magnet 4 is about 3.0 mm thick, the magnetic flux density of magnetic lines of force extending from the end faces of the permanent magnet 3 in the moving direction of the permanent magnet 3 is less than that in the related art depicted in FIG. 4A. The configuration depicted in FIG. 4C is an example within the scope of embodiments of the present invention. The magnetic force of the shield magnet 4 exceeds the strength necessary to eliminate leakage of magnetic lines of force. Therefore, although the magnetic flux density of magnetic lines of force extending in the moving direction of the permanent magnet 3 may be reduced, partial leakage of magnetic lines of force still may occur. In particular, magnetic lines of force may radiate slightly from an end face of the shield magnet 4 in the moving direction of the permanent magnet 3.

When a thickness of the shield magnet 4 is about 1.0 mm, as depicted in FIG. 4B, the magnetic force of the shield magnet 4 is appropriate for preventing leakage of magnetic lines of force. Therefore, magnetic lines of force do not leak from the end face of the permanent magnet 3 in the moving direction of the permanent magnet 3. Thus, very few, if any, magnetic lines of force radiate from the end face of the shield magnet 4 in the moving direction of the permanent magnet 3 depicted in FIG. 4B.

Figure 5:
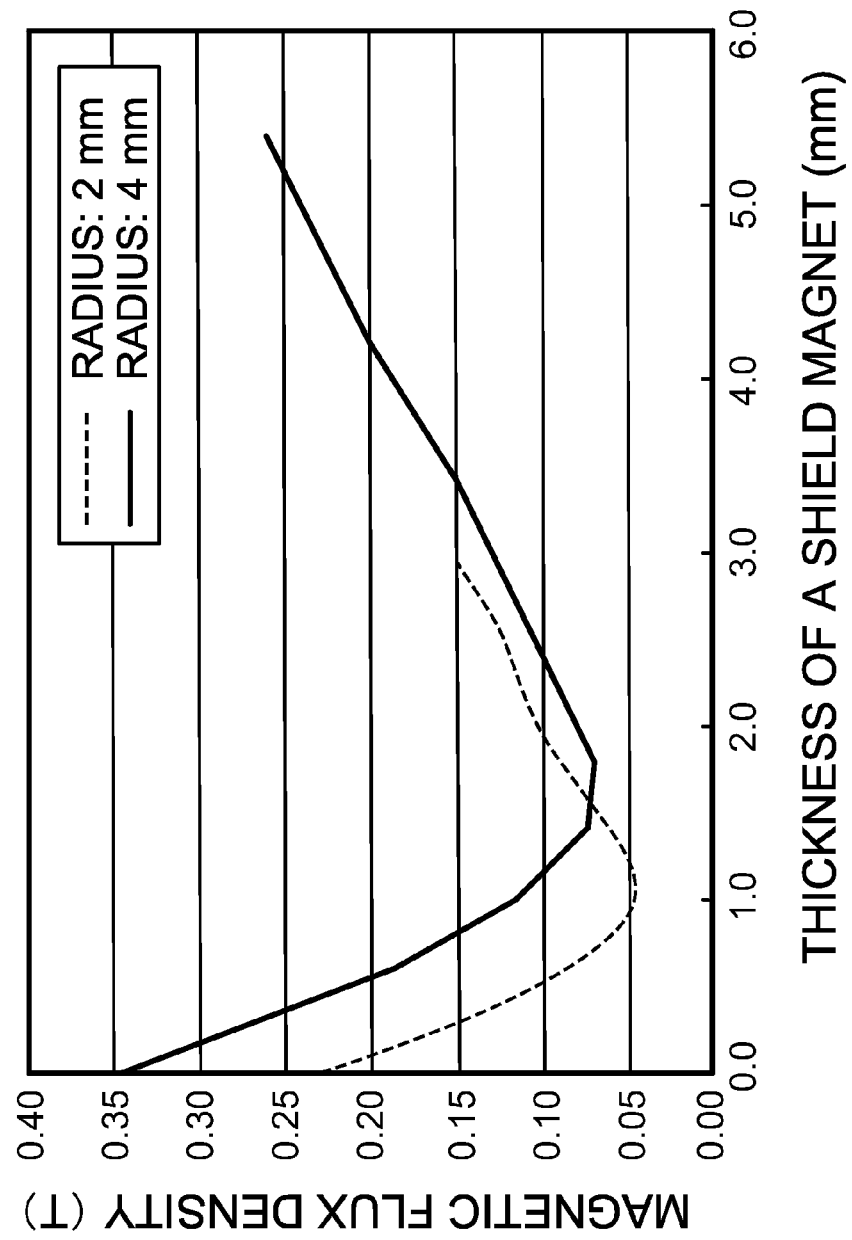
FIG. 5 is a graph showing a relationship between a thickness of a shield magnet and a magnetic flux density.

Referring to FIG. 5, a relationship between a thickness of a shield magnet and a magnetic flux density is depicted. The term "shield magnet" refers to either the first shield magnet 4 or the second shield magnet 5. In the example of FIG. 5, the permanent magnet 3 and the shield magnet are magnets of the same type. The permanent magnet 3 and the shield magnet may have substantially circular cross sections and may have about the same radius. The vertical axis in FIG. 5 corresponds to a magnetic flux density measured at a position about 1 mm apart, in the axial direction, from the center of an end face of the shield magnet. The horizontal axis in FIG. 5 corresponds to a thickness of the shield magnet. The indicated thickness of "0.0" of the shield magnet corresponds to configurations in which there is no shield magnet.

A dotted line in FIG. 5 represents the configuration in which each of the shield magnet and the permanent magnet 3 has a radius of about 2 mm. In the related art that has no shield magnet (i.e., a thickness of "0.0"), the magnetic flux density is about 0.23 T. When the thickness of the shield magnet is less than about 1.0 mm, the magnetic flux density decreases as the thickness of the shield magnet increases. The magnetic flux density is at a minimum when the thickness of the shield magnet is about 1.0 mm. Specifically, the minimum magnetic flux density is about 0.05 T, which is about one-fifth of the magnetic flux density when there is no shield magnet. When the thickness of the shield magnet is greater than about 1.0 mm, the magnetic flux density increases as the thickness of the shield magnet increases.

A solid line in FIG. 5 represents the configuration in which each of the shield magnet and the permanent magnet 3 has a radius of about 4 mm. In the related art that has no shield magnet (i.e., a thickness of "0.0"), the magnetic flux density is about 0.35 T. When the thickness of the shield magnet is less than about 2.0 mm, the magnetic flux density decreases as the thickness of the shield magnet increases. The magnetic flux density is at a minimum when the thickness of the shield magnet is about 2.0 mm. Specifically, the minimum magnetic flux density is about 0.07 T, which is about one-fifth of the magnetic flux density when there is no shield magnet. When the thickness of the shield magnet is greater than about 2.0 mm, the magnetic flux density increases as the thickness of the shield magnet increases.

Referring to FIG. 5, the magnetic flux density is at a minimum when the thickness of the shield magnet is about half the radius of the shield magnet. Similarly, referring to FIG. 4B, when the radius of each of the permanent magnet 3 and the shield magnet is about 2.0 mm and the thickness of the shield magnet is about 1.0 mm, very few, if any, magnetic lines of force radiate from the end face of the shield magnet 4 in the moving direction of the permanent magnet 3. When the thickness of the shield magnet is about half the radius of the shield magnet, the magnetic flux density is about one-fifth of the magnetic flux density when there is no shield magnet.

Further, referring to FIG. 5, when there is a shield magnet, the magnetic flux density is less than the magnetic flux density when there is no shield magnet. For example, when the thickness of the shield magnet is in a range from about 25% to about 90% of the radius of the shield magnet, the magnetic flux density may be at least 50% less than the magnetic flux density when there is no shield magnet. The magnetic flux density may be at a minimum when the thickness of the shield magnet is about half the radius of the shield magnet.

Figure 6:
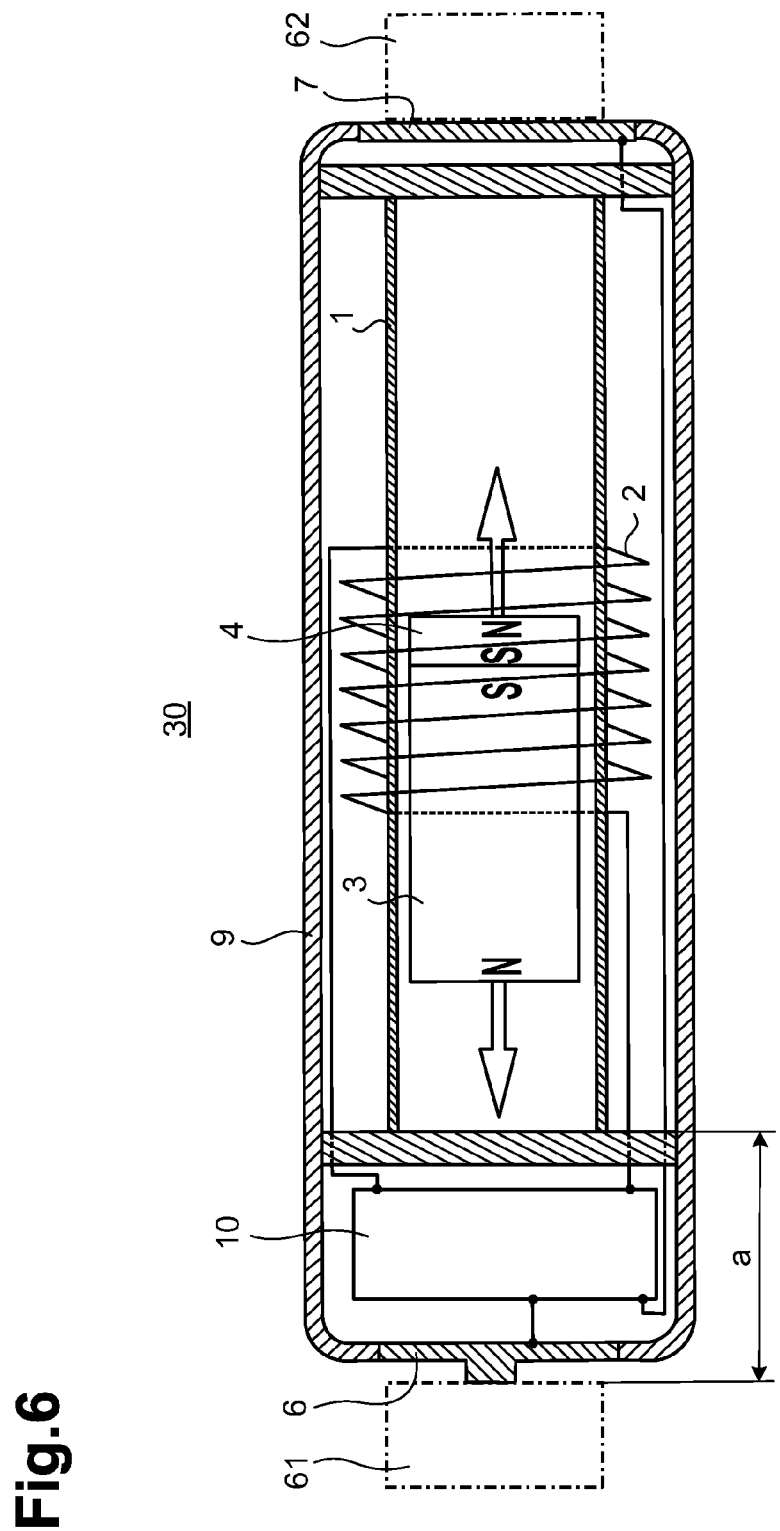
FIG. 6 is a cross-sectional view of a vibration energy generator according to an embodiment of the invention.
Figure 7:
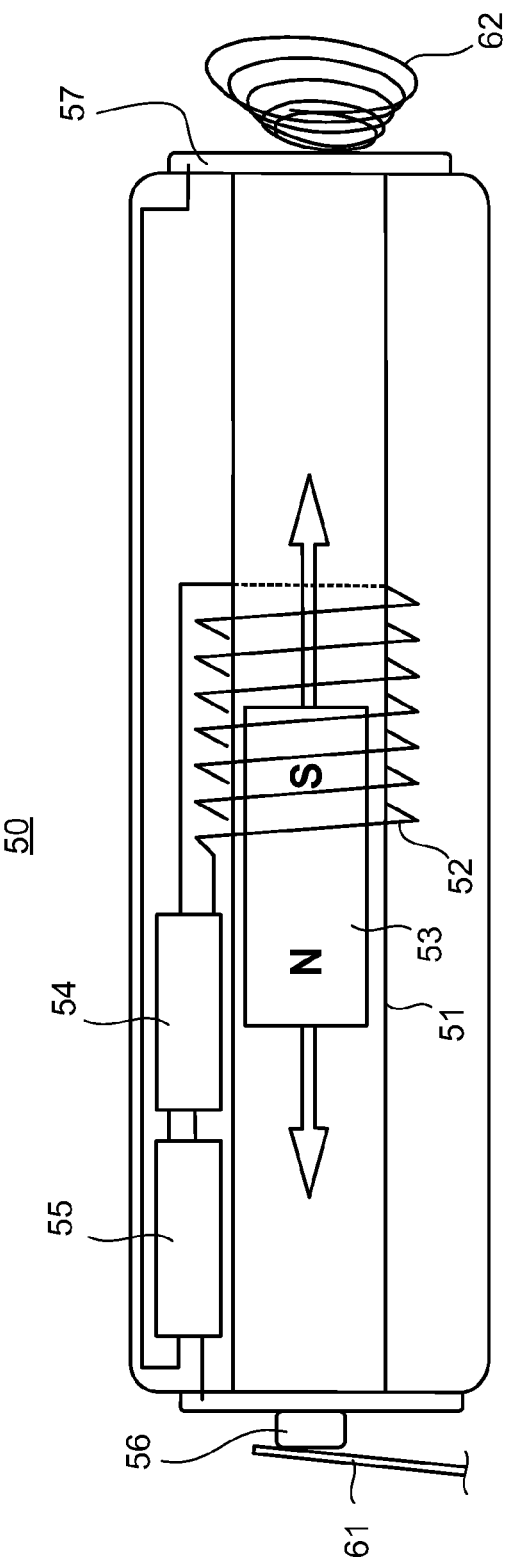
FIG. 7 depicts a known battery-type vibration energy generator.

FIG. 6 is a cross-sectional view of a vibration energy generator 30 according to an embodiment of the invention. In the vibration energy generator 20 depicted in FIG. 1, the first shield magnet 4 and the second shield magnet 5 may be disposed at either end portion of the permanent magnet 3. In the vibration energy generator 30 depicted in FIG. 6, the first shield magnet 4 may be disposed only in one end portion of the permanent magnet 3. Similar to the vibration energy generator 20 depicted in FIG. 1, the rectified energy storage unit 10 may be disposed in a position outside one end portion of the nonmagnetic tubular case 1 of vibration energy generator 30. The one end portion of the nonmagnetic tubular case 1 and the positive electrode 6 may be spaced from each other by a distance "a." The metal contact 61 and the other end portion of the permanent magnet 3 adjacent to the rectified energy storage unit 10 may be spaced from each other by a predetermined distance. Therefore, if the distance "a" is sufficient, the permanent magnet 3 may not be attracted to the metal contact 61 even if there is no shield magnet in the other end portion of the permanent magnet 3. Thus, if the distance "a" is sufficient, the attraction of the permanent magnet 3 to the metal contacts 61 and 62 may be prevented by providing the first shield magnet 4 only in the one end portion of the permanent magnet 3 that is farther from the rectified energy storage unit 10.

While the invention has been described in connection with various exemplary structures and illustrative embodiments, it will be understood by those skilled in the art that other variations and modifications of the structures, configurations, and embodiments described above may be made without departing from the scope of the invention. For example, embodiments of the invention described above also may be applicable to vibration energy generators other than battery-type. It is to be understood that vibration energy generators that include such variations and modifications of the structures, configurations, and embodiments described above are also within the scope of the present invention. For example, embodiments of the present invention may be applicable to any vibration energy generator that comprises a nonmagnetic tubular case, an electromagnetic induction coil, a permanent magnet, and a magnetic body (such as a metal contact made of magnetic metal) disposed in at least one of both end portions of the permanent magnet in a moving direction of the permanent magnet. In another example, the nonmagnetic tubular case or the permanent magnet may not be circular in cross section, and may be oval or polygonal, such as rectangular, in cross section. Components may be moved, added to, or removed from the vibration energy generator 20 depicted in FIG. 1, and the vibration energy generator 30 depicted in FIG. 6, as long as it remains possible to reduce the magnetic flux density of magnetic lines of force from the end face of the permanent magnet 3. For example, the vibration energy generator according to embodiments of the invention may have any configuration as long as it comprises at least the nonmagnetic tubular case 1, the electromagnetic induction coil 2, the permanent magnet 3, and either one of the first shield magnet 4 and the second shield magnet 5. In the embodiments described above, the shield magnet and the permanent magnet are secured directly to each other. Nevertheless, the shield magnet and the permanent magnet may be secured indirectly to each other, with another member interposed therebetween.

According to embodiments of the invention, it may be possible to reduce the magnetic flux density of magnetic lines of force radiating from an end face of a permanent magnet of a vibration energy generator. Other structures, configurations, and embodiments will be apparent to those skilled in the art from a consideration of the specification or the practice of the invention disclosed herein. It is intended that the specification and the described examples are illustrative with the true scope of the invention being defined by the following claims.

What is claimed is:

1. A vibration energy generator, comprising:
   a case elongated in one direction, the case comprising a nonmagnetic material;
   a coil surrounding an outer surface of the case;
   a permanent magnet, magnetized with a polarity oriented in the one direction, configured to reciprocate inside the case along the one direction; and
   a shield magnet disposed adjacent to one end portion of the permanent magnet in the one direction,
   wherein a surface of the one end portion and a surface of the shield magnet facing the surface of the one end portion have the same magnetic polarities, and
   wherein the length of the shield magnet in the one direction is less than the length of the permanent magnet in the one direction.

2. The vibration energy generator according to claim 1, further comprising:
   a further shield magnet disposed in the other end portion of the permanent magnet in the one direction, wherein a surface of the other end portion and a surface of the further shield magnet facing the surface of the other end portion have the same magnetic polarities.

3. The vibration energy generator according to claim 1, further comprising:
   a rectifier circuit electrically connected to the coil, the rectifier circuit being configured to rectify induced current generated in the coil by reciprocation of the permanent magnet.

4. The vibration energy generator according to claim 3, further comprising:
   a capacitor configured to be charged by rectified current from the rectifier circuit.

5. The vibration energy generator according to claim 4, wherein
   the rectifier circuit and the capacitor are disposed outside the case and adjacent to one end portion of the case in the one direction.

6. The vibration energy generator according to claim 5, wherein
   the rectifier circuit and the capacitor are disposed in the opposite direction from the shield magnet.

7. The vibration energy generator according to claim 1, wherein
   the shield magnet and the permanent magnet each have a substantially circular cross section in a direction perpendicular to the one direction.

8. The vibration energy generator according to claim 7, wherein
   a radius of the substantially circular cross section of the shield magnet is the same as a radius of the substantially circular cross section of the permanent magnet.

9. The vibration energy generator according to claim 8, wherein
   a thickness of the shield magnet in the one direction is in a range from about 25% to about 90% of the radius of the shield magnet.

10. The vibration energy generator according to claim 9, wherein
    the thickness of the shield magnet is about half of the radius of the shield magnet.

11. The vibration energy generator according to claim 1, further comprising:
    an outer case configured to store the case; and
    an electrode disposed in one end portion of the outer case in the one direction, wherein the electrode is electrically connected to the coil.

12. The vibration energy generator according to claim 11, further comprising:
    a rectifier circuit electrically connected to the coil, the rectifier circuit being configured to rectify induced current generated in the coil by reciprocation of the permanent magnet, wherein the electrode is electrically connected to the coil via the rectifier circuit.

* * * * *